United States Patent
Yang

(10) Patent No.: US 12,494,539 B2
(45) Date of Patent: Dec. 9, 2025

(54) POUCH CELL DEVICE AND TAB BRACKET

(71) Applicant: C-TECH UNITED CORPORATION, New Taipei (TW)

(72) Inventor: Chih-Kun Yang, New Taipei (TW)

(73) Assignee: C-TECH UNITED CORPORATION, New Taipei (TW)

( * ) Notice: Subject to any disclaimer, the term of this patent is extended or adjusted under 35 U.S.C. 154(b) by 560 days.

(21) Appl. No.: 17/979,855

(22) Filed: Nov. 3, 2022

(65) Prior Publication Data

US 2024/0154226 A1   May 9, 2024

(51) Int. Cl.
*H01M 50/211* (2021.01)
*H01M 50/247* (2021.01)
*H01M 50/262* (2021.01)

(52) U.S. Cl.
CPC ....... *H01M 50/211* (2021.01); *H01M 50/262* (2021.01); *H01M 50/247* (2021.01)

(58) Field of Classification Search
CPC ... H01M 50/505; H01M 50/55; H01M 50/211
See application file for complete search history.

(56) References Cited

U.S. PATENT DOCUMENTS

2014/0011071 A1*  1/2014  Suzuki ............... H01M 50/119
                                                   429/153
2023/0061563 A1*  3/2023  Choi ................. H01M 10/625

FOREIGN PATENT DOCUMENTS

| CN | 210866299 U | 6/2020 |
| CN | 112382808 A | 2/2021 |
| CN | 212874687 U | 4/2021 |
| CN | 215578959 U | 1/2022 |
| TW | M642736 U | 6/2023 |

* cited by examiner

*Primary Examiner* — Maria Laios
(74) *Attorney, Agent, or Firm* — Li & Cai Intellectual Property (USA) Office

(57) ABSTRACT

A pouch cell device and a tab bracket are provided. The pouch cell device includes a housing, and a battery pack, a tab bracket, and a series-parallel unit that are disposed in the housing. The battery pack includes a plurality of pouch cells, a plurality of first electrodes, and a plurality of second electrodes. The tab bracket is spaced apart from the battery pack, and includes a plurality of guiding portions and a plurality of abutting portions. The guiding portions gradually expand toward the battery pack. The abutting portions are respectively connected to the guiding portions. The first electrodes and the second electrodes respectively pass through the guiding portions and are abutted by the abutting portions. The series-parallel unit is electrically coupled to the first electrodes and the second electrodes.

10 Claims, 9 Drawing Sheets

… (1)

POUCH CELL DEVICE AND TAB BRACKET

FIELD OF THE DISCLOSURE

The present disclosure relates to a device and a bracket, and more particularly to a pouch cell device and a tab bracket.

BACKGROUND OF THE DISCLOSURE

A conventional pouch cell device includes a plurality of pouch cells, a plurality of electrode sheets, and a circuit board. The electrode sheets respectively extend from the pouch cells, and are fixed and connected to the circuit board by welding, so that the pouch cells are connected in series and parallel to each other. However, during a welding process of the conventional pouch cell device, excessive heat energy is often directly transmitted to the pouch cells through the electrode sheets, thereby damaging the pouch cells and affecting yields.

SUMMARY OF THE DISCLOSURE

In response to the above-referenced technical inadequacies, the present disclosure provides a pouch cell device and a tab bracket.

In one aspect, the present disclosure provides a pouch cell device. The pouch cell device includes a housing, a battery pack, a tab bracket, and a series-parallel unit. The battery pack is disposed in the housing and includes a plurality of pouch cells, and a plurality of first electrodes and a plurality of second electrodes that respectively extend from the pouch cells. The tab bracket is disposed in the housing and spaced apart from the pouch cells. The tab bracket has a depth direction, and includes a plurality of guiding portions and a plurality of abutting portions. The guiding portions extend along the depth direction and are tapered shapes that gradually diminish away from the battery pack. The abutting portions respectively extend from the guiding portions along the depth direction. The first electrodes and the second electrodes respectively pass through the guiding portion and are abutted by the abutting portions. Ends of the first electrodes and the second electrodes are exposed from an outer side of the tab bracket through the abutting portions. The series-parallel unit is electrically coupled to the ends of the first electrodes and the second electrodes.

In another aspect, the present disclosure provides a tab bracket, which is mounted on a battery pack and has a depth direction. The tab bracket includes a plurality of guiding portions and a plurality of abutting portions. The guiding portions extend along the depth direction and are tapered shapes that gradually diminish away from the battery pack. The abutting portions respectively extend from the guiding portions along the depth direction. The guiding portions are configured to provide a plurality of first electrodes and a plurality of second electrodes of the battery pack respectively pass through and being abutted by the abutting portions.

Therefore, in the pouch cell device and the tab bracket provided by the present disclosure, by virtue of "the guiding portions extending along the depth direction and gradually diminishing away from the battery pack," and "the guiding portions being provided for the first electrodes and the second electrodes of the battery pack to respectively pass through, and the abutting portions respectively abutting against the first electrodes and the second electrodes," the first electrodes and the second electrodes can be protected by the tab bracket. Further, the first electrodes and the second electrodes can respectively maintain a predetermined distance from the pouch cells, so as to prevent heat energy generated during welding of the first electrodes and the second electrodes from being excessively transmitted to the pouch cells and affecting yields).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
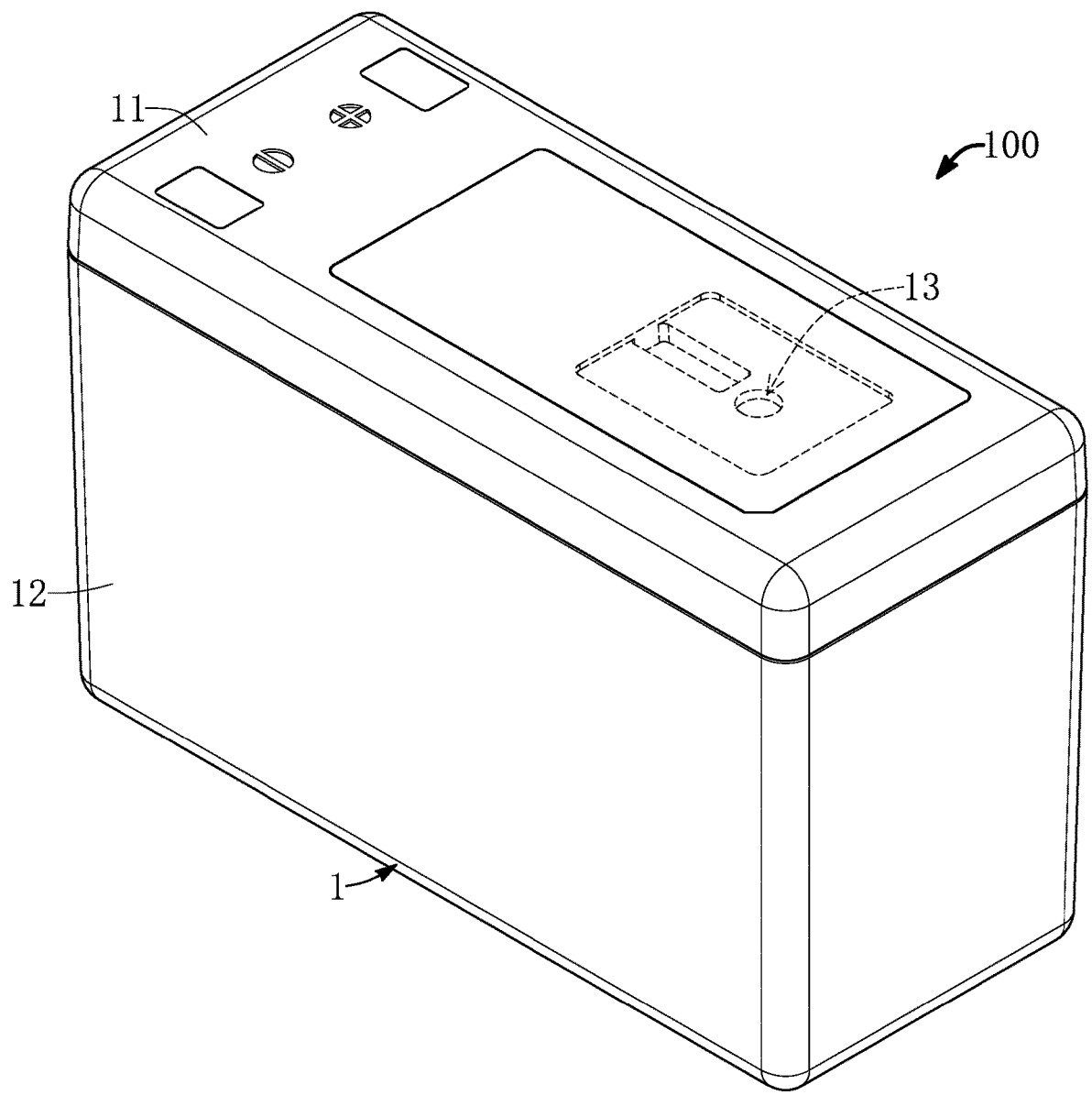
FIG. 1 is a schematic perspective view of a pouch cell device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
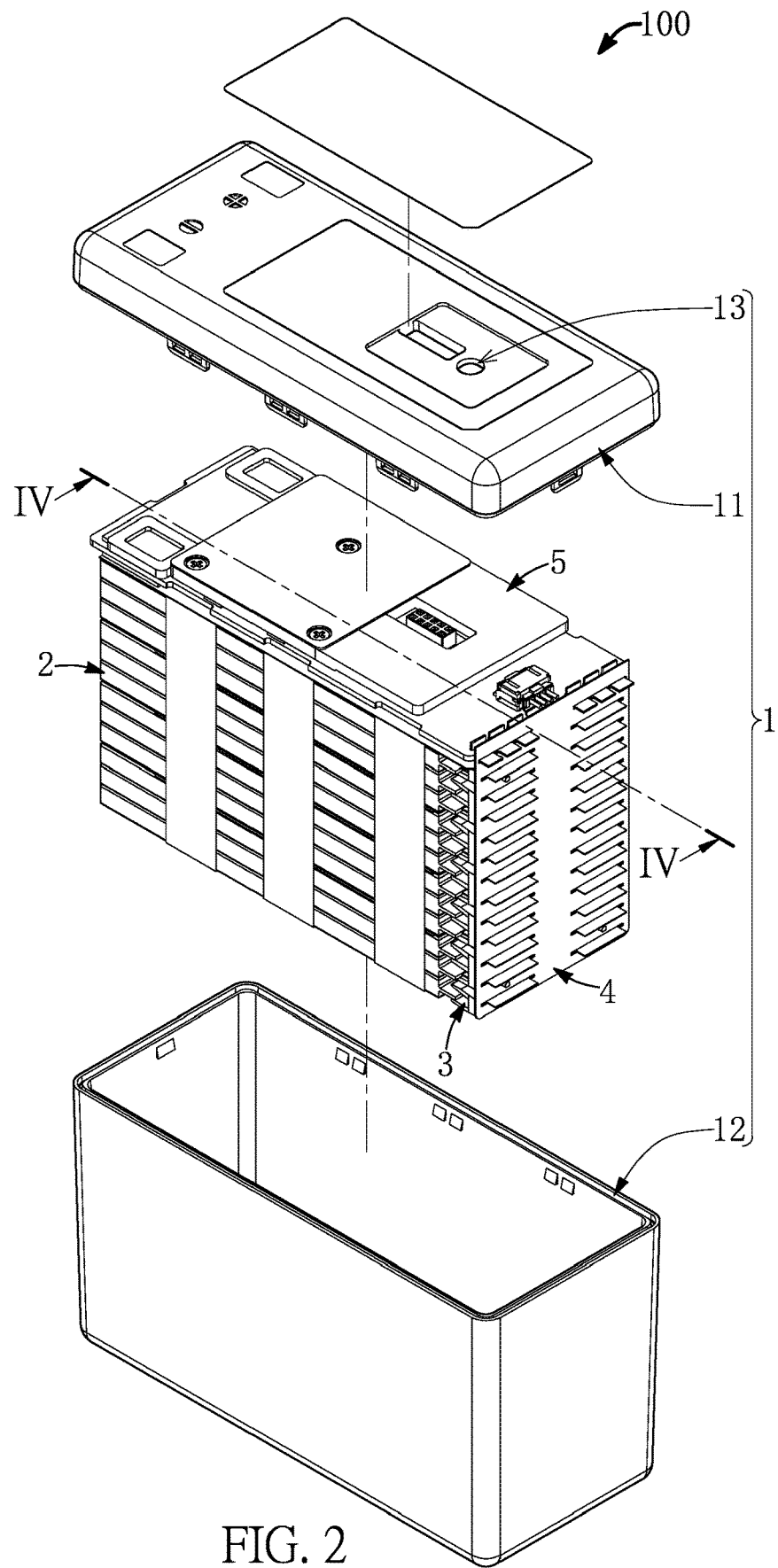
FIG. 2 is a schematic exploded view of the pouch cell device according to the present disclosure.
Figure 3:
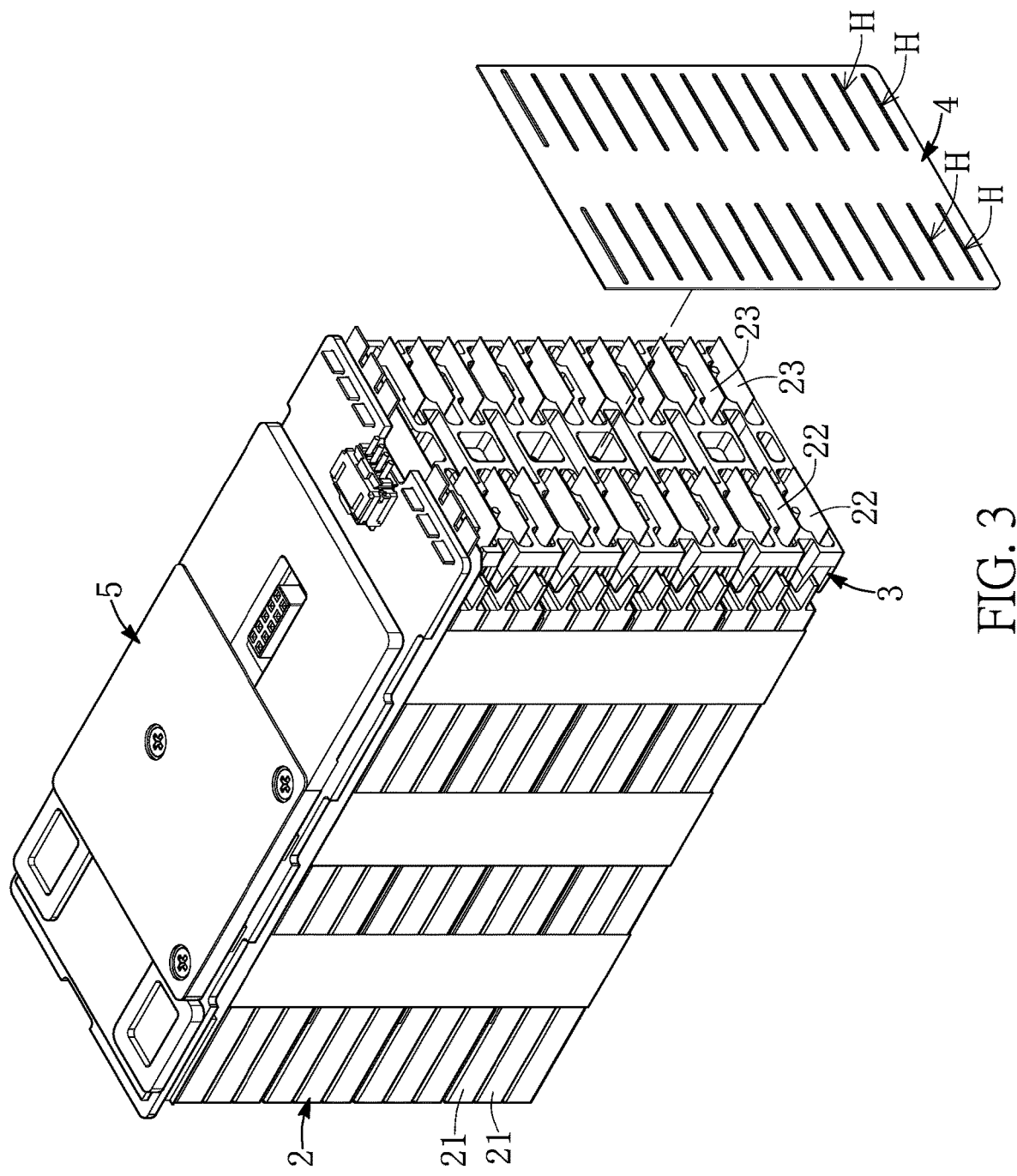
FIG. 3 is a schematic exploded view of a part of the pouch cell device according to the present disclosure.

Referring to FIG. 1 to FIG. 9, the present embodiment provides a pouch cell device 100. As shown in FIG. 1 to FIG. 3, the pouch cell device 100 includes a housing 1, a battery pack 2 and a tab bracket 3 disposed in the housing 1, and a series-parallel unit 4 that is electrically coupled to the battery pack 2.

It should be noted that the housing 1, the battery pack 2, the tab bracket 3, and the series-parallel unit 4 are jointly defined as the pouch cell device 100 in the present embodiment, but the present disclosure is not limited thereto. For example, the tab bracket 3 can be independently used (e.g., implemented, manufactured, or sold) or can be used in cooperation with other components. The following description describes the structure and connection relationship of each component of the pouch cell device 100.

Referring to FIG. 1 and FIG. 2, the housing 1 in the present embodiment is a hollow structure that is long and rectangular, and has an upper cover 11 and a base 12. The upper cover 11 can be snap-fixed to the base 12, so that the housing 1 is formed into a closed space. In a practical application, the upper cover 11 may have a communication hole 13 in spatial communication with the closed space. When gas within the closed space expands (e.g., the gas being heated), the gas can be released through the communication hole 13.

Referring to FIG. 2 and FIG. 3, the battery pack 2 is disposed at a side within the closed space, and includes a plurality of pouch cells 21, and a plurality of first electrodes 22 and a plurality of second electrodes 23 that respectively extend from the pouch cells 21.

Figure 9:
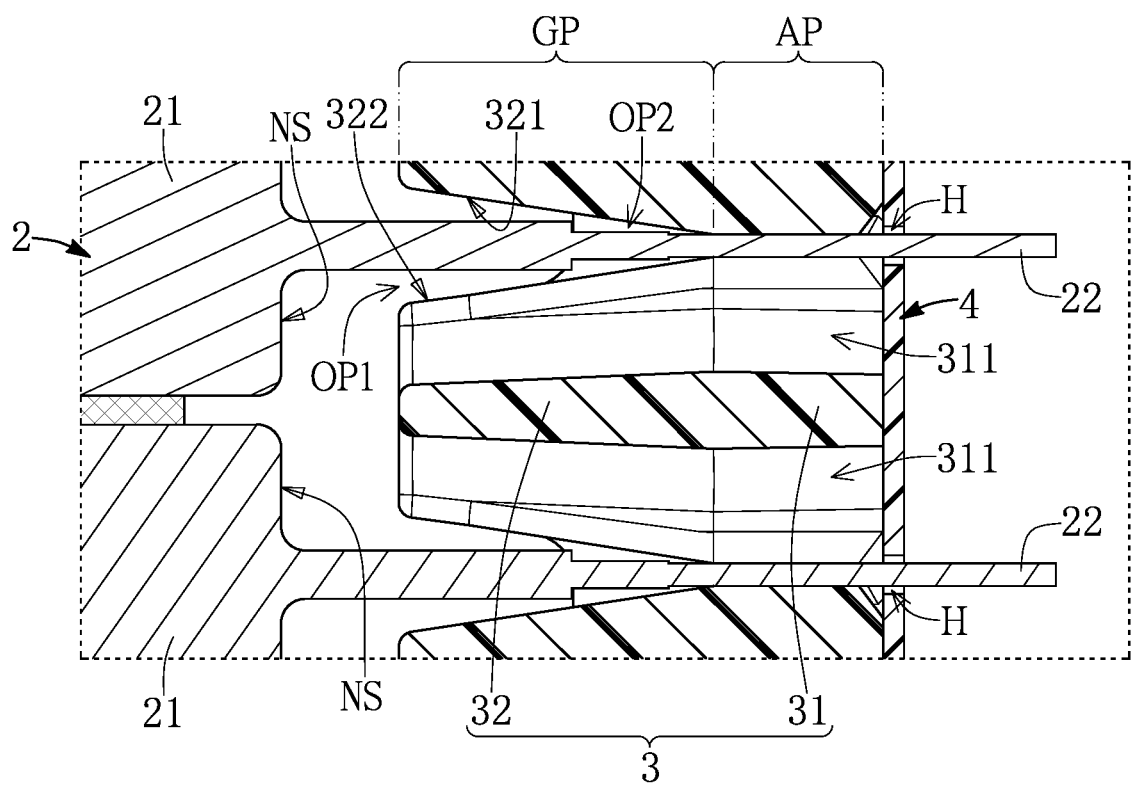
FIG. 9 is a schematic enlarged view of part IX of FIG. 4.

Specifically, the pouch cells 21 in the present embodiment are stacked onto each other, and each of the pouch cells 21 has a narrow side surface NS (as shown in FIG. 9). One of the first electrodes 22 and one of the second electrodes 23 extend from the narrow side surface NS of each of the pouch cells 21. Each of the first electrodes 22 is located at one side (e.g., a left side) of the narrow side surface NS of a corresponding one of the pouch cells 21, and each of the second electrodes 23 is located at another side (e.g., a right side) of the narrow side surface NS of the corresponding one of the pouch cells 21. That is to say, when the first electrodes 22 are positive and the second electrodes 23 are negative, the positive electrodes and the negative electrodes can be grouped into the left and right sides of the narrow side surface NS, but the present disclosure is not limited thereto. For example, the first electrodes 22 and the second electrodes 23 may also be arranged in a staggered manner (e.g., polarities of electrodes on the left side being positive, negative, positive, . . . , positive).

Preferably, the first electrodes 22 and the second electrodes 23 have a sheet-like structure, and are made of a flexible metal material. However, the present disclosure is not limited thereto. For example, in another embodiment of the present disclosure (not shown), the first electrodes 22 and the second electrodes 23 may have a columnar shape and may be made of other conductive materials that are inflexible.

Figure 4:
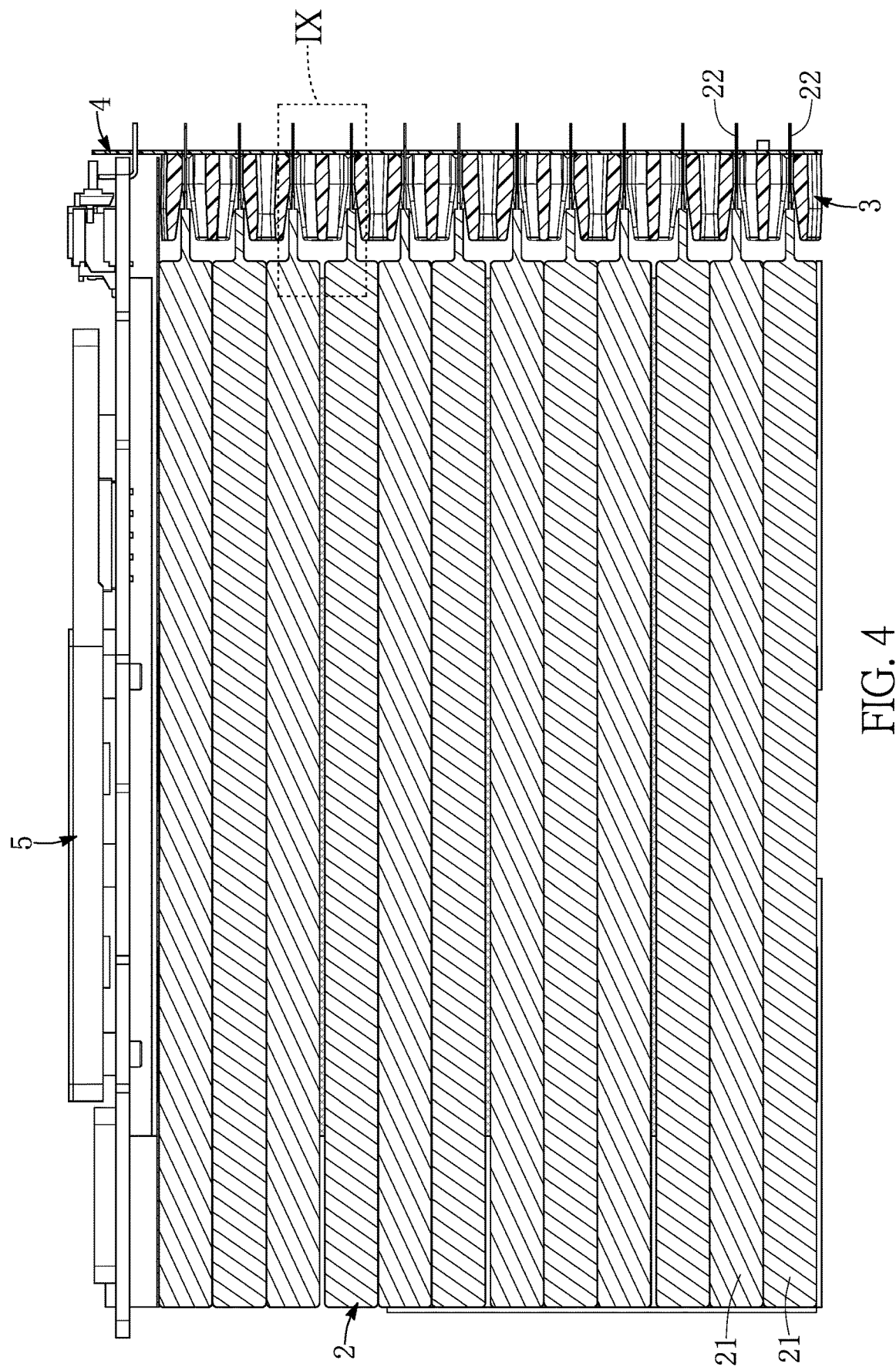
FIG. 4 is a schematic cross-sectional view taken along line IV-IV of FIG. 2.

As shown in FIG. 2, FIG. 4, and FIG. 9, the tab bracket 3 is disposed in the housing 1 and spaced apart from the pouch cells 21, so that the first electrodes 22 and the second electrodes 23 can be guided by the tab bracket 3 to move to a predetermined position and can dissipate heat through the tab bracket 3.

Figure 6:
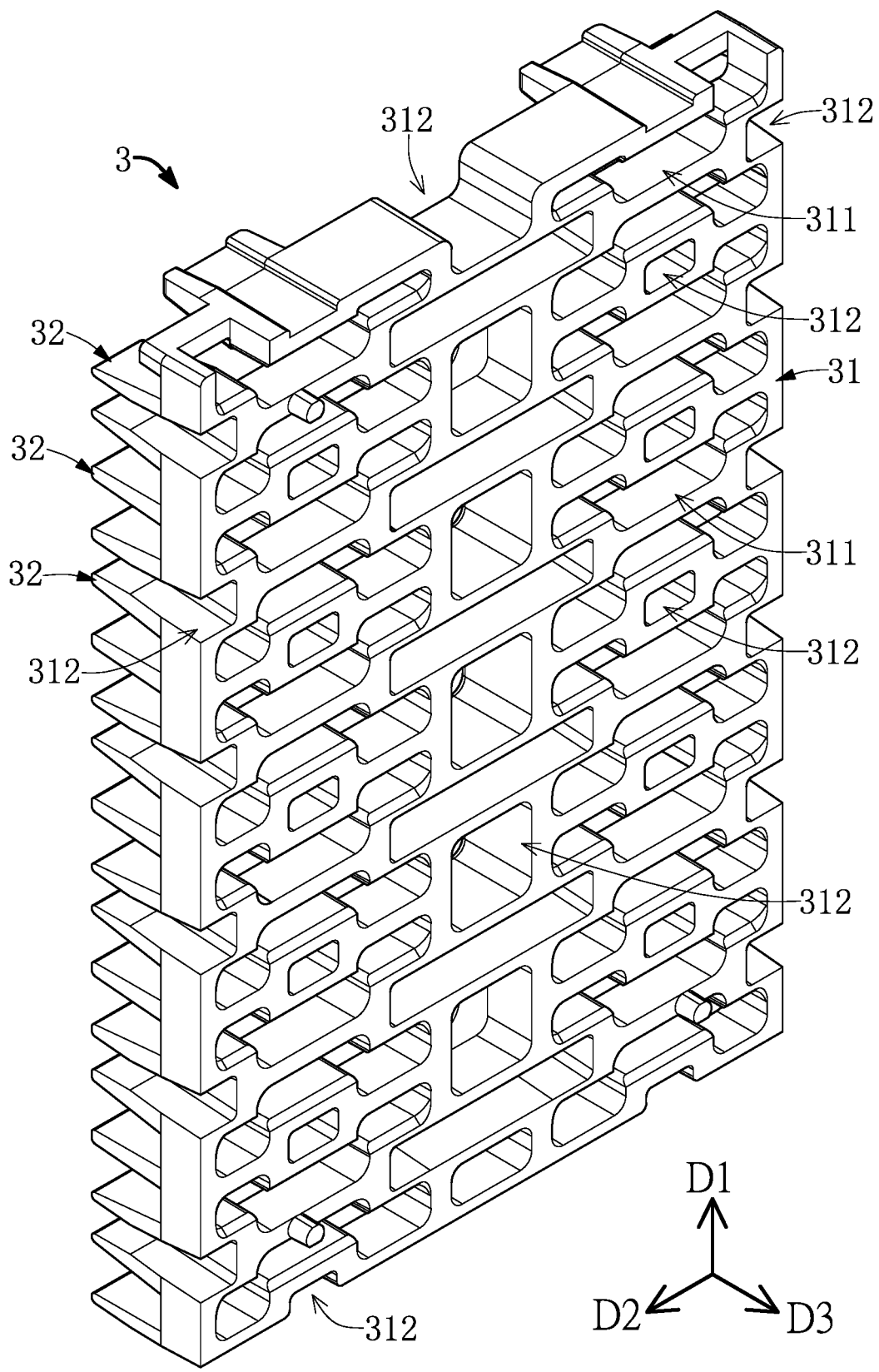
FIG. 6 is a schematic perspective view of the tab bracket according to the present disclosure.
Figure 7:
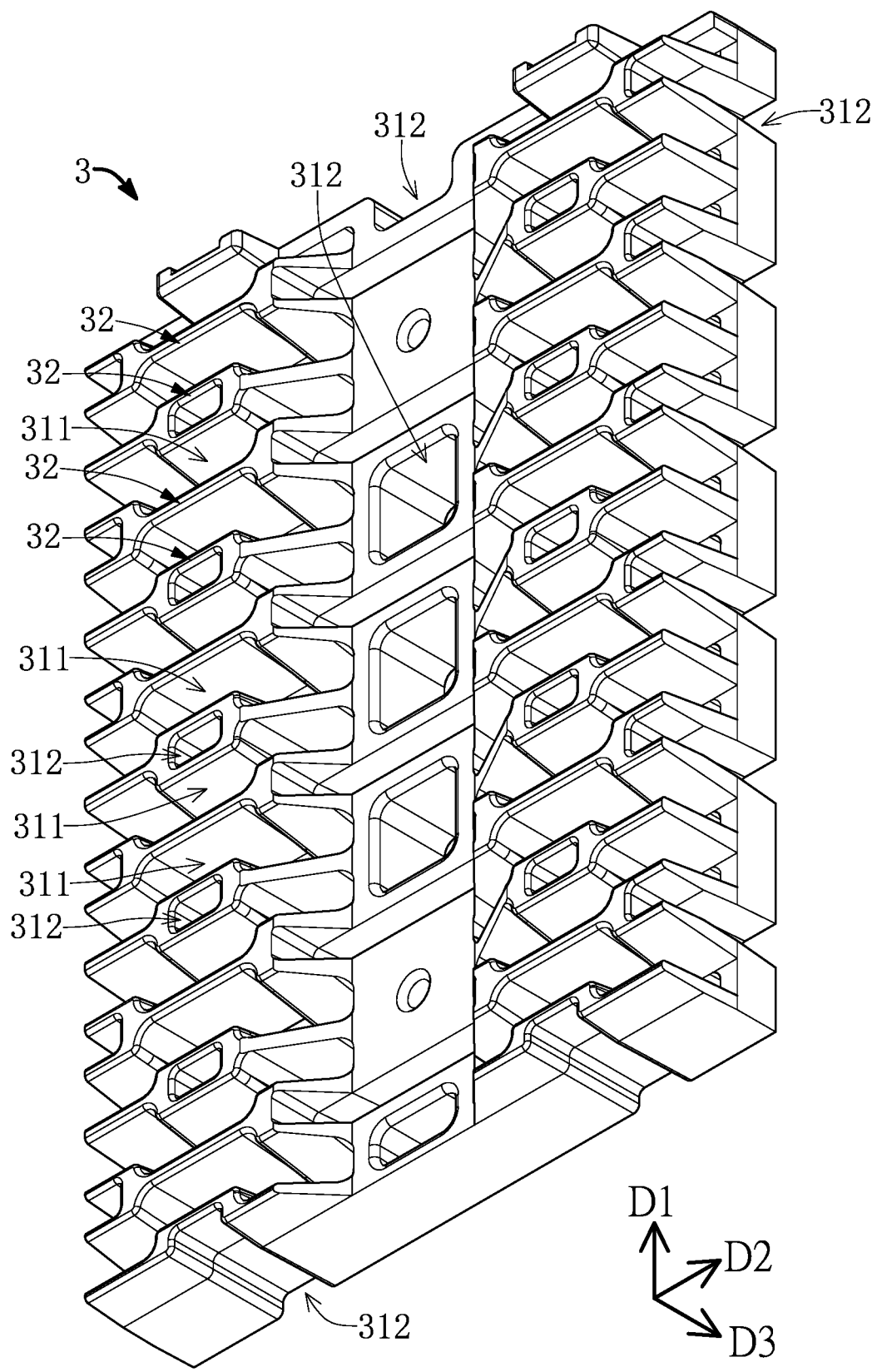
FIG. 7 is another schematic perspective view of the tab bracket according to the present disclosure.

As shown in FIG. 6, FIG. 7, and FIG. 9, the tab bracket 3 in the present embodiment can be made of a heat-dissipating plastic, and has a plate-like multi-slot (or porous) structure, but the present disclosure is not limited thereto. The tab bracket 3 has a length direction D1, a height direction that is perpendicular to the length direction D1, and a depth direction D3 that is perpendicular to the length direction D1 and the width direction D2. Both sides of the tab bracket 3 (along the depth direction D3) further include a plurality of guiding portions GP and a plurality of abutting portions AP, and the abutting portions AP are respectively connected to the guiding portion GP.

Along the depth direction D3, the guiding portions GP have a first end opening OP1 and a second end opening OP2 that are opposite to and in spatial communication with each other. The first end opening OP1 faces the battery pack 2, and an inner diameter of a cross section of the first end opening OP1 is greater than an inner diameter of a cross section of the second end opening OP2. The abutting portions AP are in spatial communication with the second end openings OP2, respectively. Further, the abutting portions AP extend from the second end openings OP2 along the depth direction D3. Accordingly, the first electrodes 22 and the second electrodes 23 can smoothly pass through the abutting portions AP via the guiding portions GP, and ends of the first electrodes 22 and the second electrodes 23 are exposed from an outer side of the tab bracket 3 through the abutting portions AP.

Figure 5:
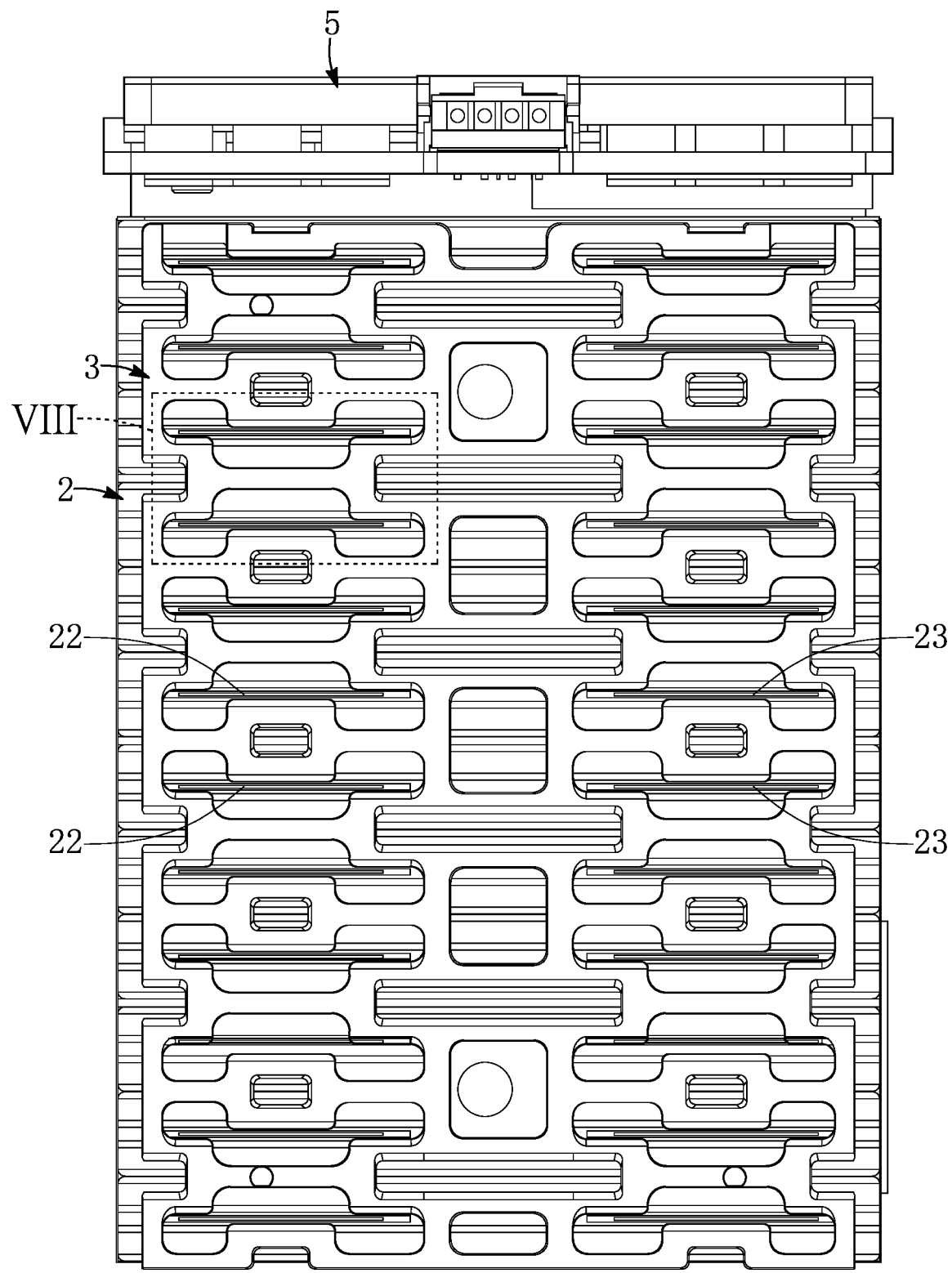
FIG. 5 is a front view showing a tab bracket being installed on a battery pack according to the present disclosure.

In a practical application, as shown in FIG. 5 to FIG. 7, the tab bracket 3 includes a bracket body 31 and a plurality of extension bumps 32 that are connected to the bracket body 31. The bracket body 31 is rectangular, and has a plurality of curved grooves 311. The curved grooves 311 are arranged in an M-by-2 matrix, in which M is a positive integer and greater than or equal to 1. Each of the curved grooves 311 is in the shape of a symbol "≠" and has two bends. An inner wall of the bracket body 31 at the two bends forms the abutting portion AP, which can be used for supporting or protecting the first electrodes 22 or the second electrodes 23.

Furthermore, as shown in FIG. 6, FIG. 7, and FIG. 9, the extension bumps 32 extend from the bracket body 31 around the curved grooves 311 toward the battery pack 2. Along the length direction D1, two sides of the curved groove 311 (e.g., above or below the curved groove 311 in FIG. 7) each have the extension bumps 32. That is, there are two extension bumps 32 around each of the curved grooves 311.

Further, referring to FIG. 9, out of the extension bumps 32 around any one of the curved grooves 311, two of the extension bumps 32 on opposite sides respectively have a first inclined surface 321 and a second inclined surface 322. Both of the first inclined surface 321 and the second inclined surface 322 gradually expand toward the battery pack 2, so as to jointly form the guiding portion GP.

Figure 8:
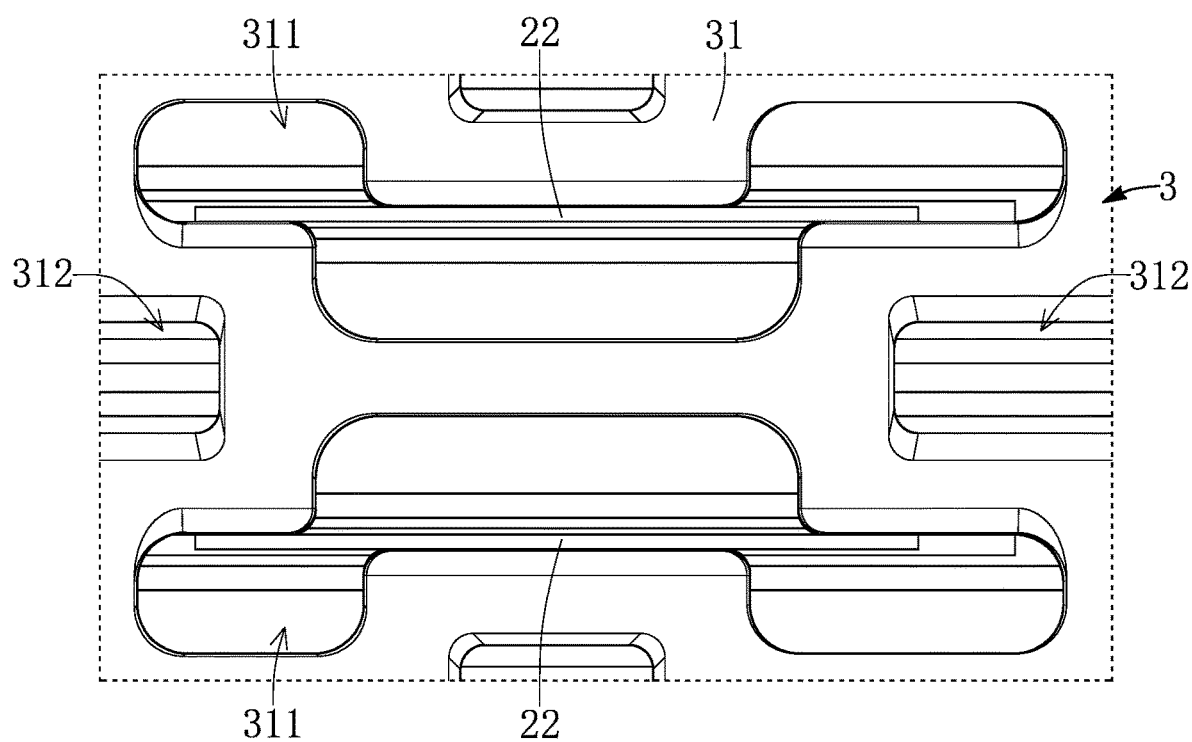
FIG. 8 is a schematic enlarged view of part VIII of FIG. 5.

In another practical application, referring to FIG. 6 to FIG. 8, the bracket body 31 further includes a plurality of heat dissipation grooves 312 located between any two of the curved grooves 311 adjacent to each other. Each of the heat dissipation grooves 312 and each of the curved grooves 311 are in spatial communication with an outside of the tab bracket 3 along the depth direction D3, so as to increase a heat dissipation effect of the tab bracket 3 on the first electrodes 22 and the second electrodes 23.

Parts of the heat dissipation grooves 312 are located at an outer periphery of the bracket body 31, and the parts of the heat dissipation grooves 312 are in spatial communication with the outside of the tab bracket 3 along the width direction D2. Preferably, an inner diameter change of each of the parts of the heat dissipation grooves 312 along the depth direction D3 is to increase in a direction away from the battery pack 2 (as shown in FIG. 6). That is, an expanding direction of each of the parts of the heat dissipation grooves 312 is opposite to an expanding direction of each of the guiding portions GP. Accordingly, the parts of the heat dissipation grooves 312 can also be used to accommodate wires.

Referring to FIG. 3, FIG. 4, and FIG. 9, the series-parallel unit 4 is disposed at a side of the tab bracket 3 away from the battery pack 2, and is electrically coupled to the ends of the first electrodes 22 and the second electrodes 23. As such, the series-parallel unit 4 can be used by a management unit 5 (e.g., a battery management system) of the pouch cell device 100 for management purposes.

In a practical application, the series-parallel unit 4 is a circuit substrate, and the circuit substrate has a plurality of through holes H corresponding in position to the abutting portions AP. The ends of the first electrodes 22 and the second electrodes 23 respectively pass through the through holes H to be electrically coupled to a circuit of the circuit substrate, so that the pouch cells 21 can be connected in series and parallel to each other and be connected to the management unit 5. However, the present disclosure is not limited thereto.

For example, in another embodiment of the present disclosure (not shown), the series-parallel unit 4 may be a conductive wire group, and the conductive wire group can be electrically coupled to the first electrodes 22 and the second electrodes 23, so that the pouch cells 21 are connected in series and parallel to each other.

Beneficial Effects of the Embodiment

In conclusion, in the pouch cell device and the tab bracket provided by the present disclosure, by virtue of "the guiding portions extending along the depth direction and gradually diminishing away from the battery pack," and "the guiding portions being provided for the first electrodes and the second electrodes of the battery pack to respectively pass through, and the abutting portions respectively abutting against the first electrodes and the second electrodes," the first electrodes and the second electrodes can be protected by the tab bracket. Further, the first electrodes and the second electrodes can respectively maintain a predetermined distance from the pouch cells, so as to prevent heat energy generated during welding of the first electrodes and the second electrodes from being excessively transmitted to the pouch cells and affecting yields). The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pouch cell device, comprising:
    a housing;
    a battery pack disposed in the housing, wherein the battery pack includes a plurality of pouch cells, a plurality of first electrodes, and a plurality of second electrodes, and the first electrodes and the second electrodes respectively extend from the pouch cells;
    an tab bracket disposed in the housing and spaced apart from the pouch cells, wherein the tab bracket has a depth direction and includes:
        a plurality of guiding portions, wherein the guiding portions extend along the depth direction and are tapered structures that gradually diminish away from the battery pack; and
        a plurality of abutting portions respectively extending from the guiding portions along the depth direction;
        wherein the first electrodes and the second electrodes respectively pass through the guiding portion and are abutted by the abutting portions; wherein ends of the first electrodes and the second electrodes are exposed from an outer side of the tab bracket through the abutting portions; and
    a series-parallel unit electrically coupled to the ends of the first electrodes and the second electrodes;
    wherein the tab bracket includes a bracket body having a plurality of curved grooves, each of the curved grooves is formed as the abutting portion, and each of the curved grooves has a plurality of slots; wherein, in any two adjacent ones of the slots, a projection path defined by orthogonally projecting one of the two slots along a length direction does not pass through another one of the two slots.

2. The pouch cell device according to claim 1, wherein the tab bracket is made of a heat-dissipating plastic; wherein each of the first electrodes and the second electrodes is made of a flexible conductive metal material, and the first electrodes and the second electrodes have a sheet-like structure.

3. The pouch cell device according to claim 1, wherein the tab bracket includes:
    a plurality of extension bumps extending from a plurality of portions of the bracket body around the curved grooves toward the battery pack, wherein, out of the extension bumps around any one of the curved grooves, two of the extension bumps on opposite sides respectively have a first inclined surface and a second inclined surface, and the guiding portion is jointly formed by the first inclined surface and the second inclined surface.

4. The pouch cell device according to claim 3, wherein the bracket body further includes a plurality of heat dissipation grooves located between any two of the curved grooves adjacent to each other, and each of the heat dissipation grooves and each of the curved grooves are in spatial communication with an outside of the tab bracket along the depth direction.

5. The pouch cell device according to claim 4, wherein the tab bracket has a width direction perpendicular to the depth direction; wherein parts of the heat dissipation grooves are located at an outer periphery of the tab bracket, and the parts of the heat dissipation grooves are in spatial communication with the outside of the tab bracket along the width direction.

6. The pouch cell device according to claim 1, wherein the series-parallel unit is a circuit substrate, the circuit substrate has a plurality of through holes that correspond in position to the abutting portions, and the first electrodes and the second electrodes respectively pass through the through holes to be electrically coupled to a circuit of the circuit substrate.

7. A tab bracket for being mounted on a battery pack, wherein the tab bracket has a depth direction and comprises:

a plurality of guiding portions, wherein the guiding portions extend along the depth direction and are tapered structures that gradually diminish away from the battery pack; and a plurality of abutting portions respectively extending from the guiding portions along the depth direction;

wherein the guiding portions are configured to provide for a plurality of first electrodes and a plurality of second electrodes of the battery pack to respectively pass through, and the abutting portions respectively abut against the first electrodes and the second electrodes; and a bracket body having a plurality of curved grooves, each of the curved grooves is formed as the abutting portion, and each of the curved grooves has a plurality of slots; wherein, in any two adjacent ones of the slots, a projection path defined by orthogonally projecting one of the two slots along a length direction does not pass through another one of the two slots.

8. The tab bracket according to claim 7, further comprising:

a plurality of extension bumps extending from a plurality of portions of the bracket body around the curved grooves toward the battery pack; wherein out of the extension bumps around any one of the curved grooves, two of the extension bumps on opposite sides respectively have a first inclined surface and a second inclined surface, and the guiding portion is jointly formed by the first inclined surface and the second inclined surface.

9. The tab bracket according to claim 8, wherein the bracket body further includes a plurality of heat dissipation grooves located between any two of the curved grooves adjacent to each other, and each of the heat dissipation grooves and each of the curved grooves are in spatial communication with an outside of the tab bracket along the depth direction.

10. The tab bracket according to claim 9, wherein the tab bracket has a width direction perpendicular to the depth direction; wherein parts of the heat dissipation grooves are located at an outer periphery of the tab bracket, and the parts of the heat dissipation grooves are in spatial communication with the outside of the tab bracket along the width direction.

* * * * *